S. A. MOSS.
FUEL FEEDING SYSTEM FOR INTERNAL COMBUSTION ENGINES.
APPLICATION FILED MAY 31, 1919.
1,413,419.
Patented Apr. 18, 1922.
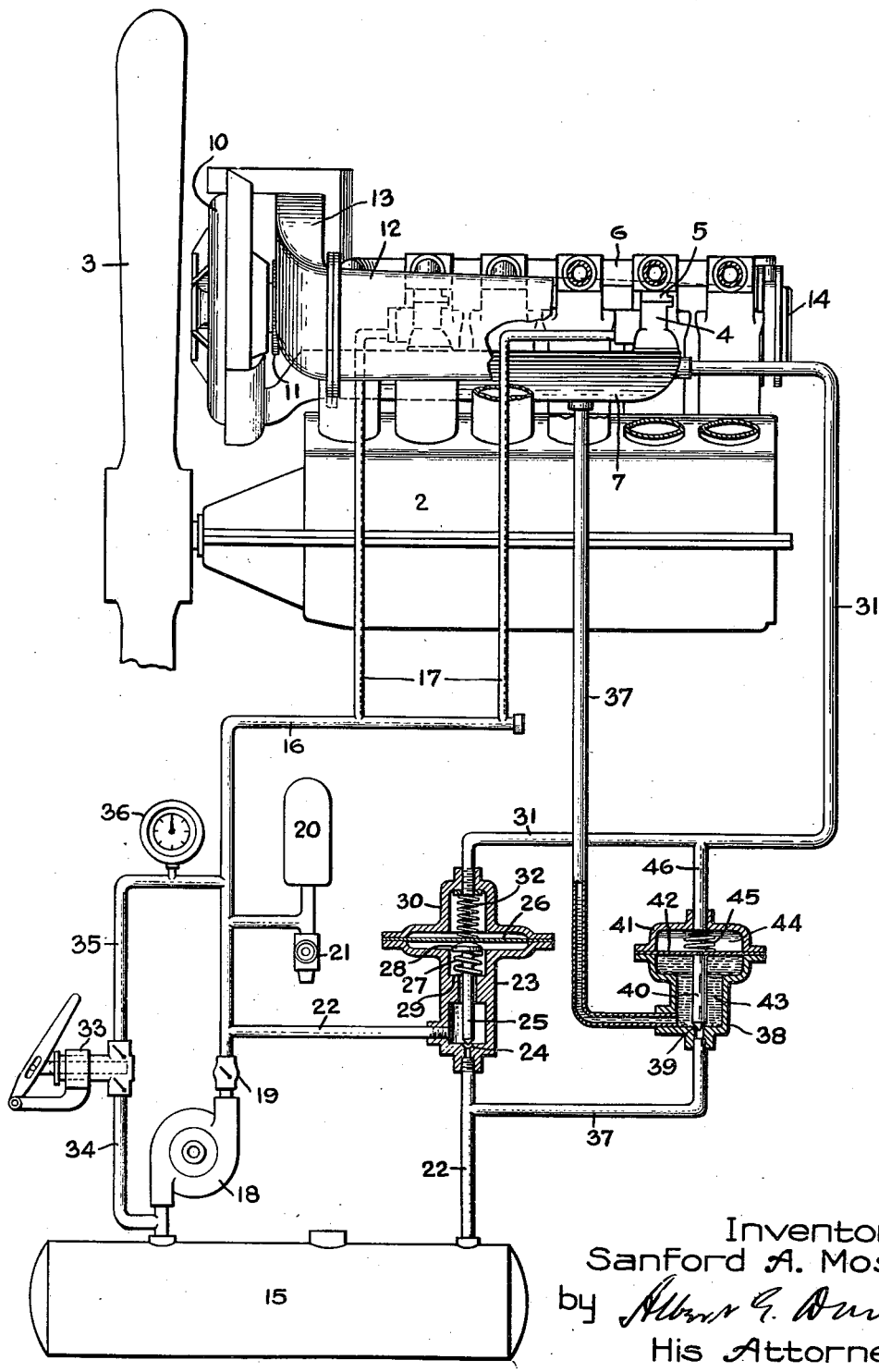
Inventor,
Sanford A. Moss
by Albert G. Davis
His Attorney

UNITED STATES PATENT OFFICE.

SANFORD A. MOSS, OF LYNN, MASSACHUSETTS, ASSIGNOR TO GENERAL ELECTRIC COMPANY, A CORPORATION OF NEW YORK.

FUEL-FEEDING SYSTEM FOR INTERNAL-COMBUSTION ENGINES.

1,413,419.          Specification of Letters Patent.     Patented Apr. 18, 1922.

Application filed May 31, 1919. Serial No. 301,106.

*To all whom it may concern:*

Be it known that I, SANFORD A. MOSS, a citizen of the United States, residing at Lynn, county of Essex, State of Massachusetts, have invented certain new and useful Improvements in Fuel-Feeding Systems for Internal-Combustion Engines, of which the following is a specification.

The present invention relates to fuel feeding systems for internal combustion engines and is more particularly intended for use in feeding fuel to the carburetors of aeroplane engines wherein the aeroplane is provided with a supercharger for supplying air to the carburetors at a pressure greater than that of the atmosphere through which the aeroplane may be passing. The invention is not, however, limited to this particular application but may be used in connection with automobile engines, stationary engines or the like, which engines may or may not be provided with a supercharger or other means for supplying air at a pressure greater than that of the surrounding atmosphere.

The object of my invention is to provide an improved fuel feeding system, and for a consideration of what I believe to be novel and my invention, attention is directed to the accompanying specification and the claims appended thereto.

In the drawing, the figure is a diagrammatic view of a fuel feeding system embodying my invention, the same being shown by way of example in connection with an aeroplane engine provided with a supercharger for supplying air to the carburetors of the engine.

Referring to the drawing, 2 indicates an internal combustion engine, which may be an aeroplane engine driving a propeller 3, or an engine for other purposes. 4 indicates carburetor means for the engine, the same being connected to conduits 5 which lead to the usual intake manifold 6, and 7 indicates a supercharger conduit through which air is supplied to carburetors 4. Supercharger conduit 7 may receive air at a suitable pressure from any available source such as a centrifugal compressor, and such compressor may be direct driven from the engine shaft or particularly in the case of an aeroplane engine it may be driven by a turbine which is operated by exhaust gases from the engine. In the present instance a supercharger of the latter type is illustrated, the same comprising a centrifugal compressor 10 driven by a turbine wheel 11 which is actuated by exhaust gases from the engine. The exhaust manifolds of the engine are indicated at 12, there being one on each side of the engine. At one end they feed exhaust gases to a gas chamber 13 which contains an arc of nozzles (not shown) for directing the gases against the buckets of the turbine wheel. At their other ends exhaust manifolds 12 are open to atmosphere and at such ends are suitable valves 14 which may be adjusted to vary the amount of gases exhausted to atmosphere and fed to gas chamber 13 for regulating the operation of the supercharger. Carburetors 4 may be of the usual float feed type or other suitable type. 15 indicates a fuel supply tank, the fuel in general being gasolene.

Now, according to my invention, I provide a supply pipe which connects the fuel tank to the carburetor or carburetors of the engine, and connect to such pipe a power driven pump for pumping fuel from the supply tank through the supply pipe to the carburetor or carburetors of the engine, which pump is of such capacity that it is certain to always supply more fuel, such as gasolene, than is needed by the engine. I then provide a waste pipe which leads from a point in the supply pipe which is on the discharge side of the pump, and controls the flow of fuel through the same by means of an automatic valve which wastes just sufficient fuel to always maintain a suitable pressure in the fuel supply pipe. Such pressure must be at least slightly above the pressure of the air supplied to the carburetor or carburetors in order that the fuel will flow to them, and hence I place the automatic waste valve under the control of the pressure of the air supplied thereto. With the above described arrangement therefore, I have available always at the carburetor or carburetors fuel under a desired pressure and such fuel will be fed to the carburetor or carburetors through the usual carburetor float controlled valve means in the ordinary manner.

In the drawing, 16 indicates a fuel supply pipe having branches 17 leading to the carburetors, and 18 indicates a pump which pumps fuel from tank 15 through fuel pipe 16 and branch pipes 17 to the carburetors. Pump 18 may be driven by any suitable arrangement and preferably either directly or indirectly from the crank shaft of the engine. On the discharge side of pump 18 is a non-return check valve 19 and a pressure dome 20 provided with a drain cock 21. Connected to pipe 16 at a point beyond check valve 19 is a waste pipe 22 which preferably leads back to supply tank 15. Controlling the flow of fuel through waste pipe 22 is an automatic waste valve comprising a casing 23 having a seat 24 against which rests a needle valve 25. The upper end of valve casing 23 is closed by a diaphragm 26 and the end of the stem of needle valve 25 is held in contact with the under side of diaphragm 26 by a light coiled spring 27 which at one end engages a head 28 on the end of the needle valve stem and at the other end engages a shoulder 29 in valve casing 23. The upper side of diaphragm 26 is enclosed by a cap 30 to which is connected a pipe 31 leading to the supercharger supply conduit. Bearing on the upper side of diaphragm 26 is a coiled spring 32. It will thus be seen that the diaphragm 26 is subjected on its lower side to the pressure of the fuel supplied to the carburetors plus the slight pressure exerted by spring 27 and on its upper side to the pressure of the air supplied to the carburetors plus the pressure exerted by spring 32. When the system is operating therefore, valve 25 will remain closed until the pressure of fuel supplied to the carburetors exceeds the pressure of the air supplied thereto by an amount sufficient to overcome the pressure exerted by spring 32. This, of course, can be made anything desired by the proper selection of spring 32 and by adjusting it. When the pressure of the fuel exceeds this amount, then valve 25 will be opened to permit fuel to waste, and as is obvious, will operate automatically to maintain the desired difference in pressure between the fuel supply and the air supply. There is thus always present at the carburetors a supply of fuel under suitable pressure ready to be fed thereto.

A suitable hand pump 33 is provided having its suction side connected to supply tank 15 by pipe 34 and its discharge side connected to fuel supply pipe 16 by pipe 35, and is used for priming the system in starting. At a suitable point in the system is a pressure indicator 36 for indicating to the operative the pressure existing in the system.

It may sometimes happen with an apparatus as above described, particularly when used in connection with an aeroplane, that fuel (usually gasolene) will be spilled from the carburetor or carburetors into the supercharger air conduit and to take care of this I provide a drain pipe which connects with a low point in the supercharger air conduit and is of a vertical length to provide an appreciable head of fuel. I then provide in this pipe an automatic drain valve which is controlled by the pressure of such head of fuel for draining the fuel from the drain pipe. The fuel may be drained to any suitable point but preferably back to the supply tank.

In the drawing, 37 indicates a drain pipe leading from a low point in supercharger conduit 7 to fuel tank 15 and in this pipe is an automatic waste valve comprising a casing 38 having a seat 39 against which takes a valve 40. The upper end of casing 38 is closed by a cap 41 between which and the casing is a diaphragm 42 which divides the casing into two chambers 43 and 44. The upper end of the stem of valve 40 is attached to diaphragm 42 and in chamber 44 is a light spring 45 which normally holds valve 40 against seat 39. Chamber 43 is connected with drain pipe 37. Chamber 44 is subjected to the same pressure as that of the air supplied to the carburetor apparatus, this in the present instance being the pressure in supercharger air conduit 7 and for this purpose it is connected by a pipe 46 to pipe 31 which leads to conduit 7. It will thus be seen that diaphragm 42 is subjected on the upper side to the supercharger air pressure plus the pressure of spring 45 and on the lower side to the supercharger air pressure plus the head of fuel in pipe 37. Spring 45 is of such strength that when the pressure of the fuel head in pipe 37 reaches a predetermined value, it will overcome spring 45 and raise diaphragm 42 so as to open valve 40 and permit fuel to flow through waste pipe 37 to fuel tank 15. It will be understood, of course, that if the air being supplied to the carburetor apparatus is that of the surrounding atmosphere, then pipe 46 may be omitted, the upper side of diaphragm 42 being then subjected directly to the existing atmospheric pressure.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In combination, an engine having a carburetor, a fuel supply tank, a pump for pumping fuel from the tank to the carburetor, and an automatic valve means for maintaining a pressure on the delivery side of the pump, greater than that of the air being supplied to the carburetor.

2. In combination, an engine having a carburetor, a fuel supply tank, a pump for pumping fuel from the tank to the carburetor and an automatic valve means controlled by the pressure of the air supplied to the carburetor for maintaining a pressure on the delivery side of the pump greater than that of the air being supplied to the carburetor.

3. In combination, an engine having carbureting means, a fuel supply tank, a pump, conduits connecting the suction side of the pump to the supply tank and the delivery side to the carbureting means, and a waste valve associated with said conduit which leads from the delivery side of the pump for automatically maintaining a pressure on the delivery side of the pump which pressure is a predetermined amount greater than the pressure of air supplied to the carbureting means.

4. In combination, an engine having carbureting means, a fuel supply tank, a pump, conduits connecting the suction side of the pump to the supply tank and the delivery side to the carbureting means, and a waste valve associated with said conduit which leads from the delivery side of the pump and is automatically controlled by the pressure of the air supplied to the carbureting means for maintaining the pressure of the fuel supplied to said carbureting means greater than the pressure of the air supplied thereto.

5. In combination, an engine having carbureting means, a fuel supply tank, a pump, conduits connecting the suction side of the pump to the supply tank and the delivery side to the carbureting means, a waste pipe which leads from the conduit on the delivery side of the pump back to the supply tank, and a valve in said conduit controlled by the pressure of the air supplied to the carbureting means for controlling the flow through said waste pipe so as to maintain the pressure of fuel at the carbureting means greater than the pressure of the air supplied thereto.

6. The combination with an internal combustion engine having carbureting means and a supercharger for supplying air under pressure thereto, of a fuel supply tank, a pump for pumping fuel from the tank to said carbureting means, and means controlled by the pressure of the air supplied to the carbureting means by the super-charger for maintaining the pressure of the fuel supplied to the carbureting means greater than the supercharger air pressure.

7. The combination with an internal combustion engine having carbureting means and a supercharger for supplying air under pressure thereto, of a fuel supply tank, a pump for pumping fuel from the tank to said carbureting means, valve means for wasting fuel from the delivery side of the pump, and a movable abutment subjected on one side to the delivery pressure of the pump and on the other side to the supercharger air pressure for controlling said valve means.

8. The combination with an engine having carbureting means and a conduit through which air is supplied thereto, of a fuel tank, means for supplying fuel from the tank to the carbureting means, a drain valve, a pipe of appreciable length connecting the drain valve to the bottom of said air conduit, and means controlled by the pressure of the air supplied to the carbureting means and by the head of fuel in said pipe for operating said valve.

9. The combination with an engine having carbureting means and a conduit through which air is supplied thereto, of a drain pipe connected to the bottom of said conduit for carrying away fuel from the conduit, a valve in said pipe, and a movable abutment for controlling said valve, said abutment being subjected on one side to the pressure of the air supplied through said conduit and on the other side to the pressure of the head of fuel in the drain pipe.

10. The combination with an internal combustion engine having carbureting means, a supercharger, and a conduit for conveying air from the supercharger to said carbureting means, of a drain pipe leading from a low point in said conduit, a valve in said drain pipe, a means responsive to the pressure of the air in said conduit for regulating said valve.

11. The combination with an internal combustion engine having carbureting means, a supercharger, and a conduit for conveying air from the supercharger to said carbureting means, of a fuel tank, means for pumping fuel from said tank to the carburetors, valve means for wasting fuel from the delivery side of said pump and for draining fuel from said conduit, and means controlled by the pressure of the air in said conduit for regulating said valve means.

12. In combination, an engine having a carburetor, a fuel supply tank, a fuel pump, a conduit connecting the suction side of the fuel pump to the fuel supply tank, a conduit connecting the delivery side of said pump to the carburetor, a conduit through which air is supplied to the carburetor, and means for maintaining the pressure of the fuel supplied by the pump to the carburetor at a predetermined amount higher than that of the air supplied to the carburetor through said air conduit.

13. In combination, an engine having a carburetor, a fuel supply tank, a fuel pump, a conduit connecting the suction side of the fuel pump to the fuel supply tank, a conduit connecting the delivery side of said pump to the carburetor, a conduit through which air is supplied to the carburetor, and automatic means controlled by the pressure of the air supplied through said air conduit to the carburetor for maintaining the fuel pressure a predetermined amount higher than such air pressure.

14. The combination with an internal combustion engine having a carburetor, of a supercharger for supplying air thereto, a fuel tank, and automatic means for supplying fuel from the tank to the carburetor at a pressure a definite amount higher than the supercharger air pressure.

15. The combination with an internal combustion engine having a carburetor, of a supercharger for supplying air thereto, a fuel tank, and automatic means controlled by the pressure of the supercharged air for supplying fuel from the tank to the carburetor at a pressure a definite amount higher than that of the supercharged air.

In witness whereof, I have hereunto set my hand this 28th day of May, 1919.

SANFORD A. MOSS.